(12) United States Patent
Okabayashi et al.

(10) Patent No.: US 7,200,728 B2
(45) Date of Patent: Apr. 3, 2007

(54) ELECTRONIC APPARATUS AND PROGRAM FOR CONTROLLING COMPUTER

(75) Inventors: Masaaki Okabayashi, Hamakita (JP); Hiroshi Hamamatsu, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 458 days.

(21) Appl. No.: 10/379,268

(22) Filed: Mar. 3, 2003

(65) Prior Publication Data
US 2003/0219136 A1 Nov. 27, 2003

(30) Foreign Application Priority Data
Mar. 4, 2002 (JP) ............................. 2002-057329

(51) Int. Cl.
*G06F 12/00* (2006.01)
(52) U.S. Cl. ...................................... 711/165; 711/162
(58) Field of Classification Search ...................... None
See application file for complete search history.

(56) References Cited

U.S. PATENT DOCUMENTS

| | | | |
|---|---|---|---|
| 5,243,513 A | 9/1993 | Peters | 700/83 |
| 5,525,142 A | 6/1996 | Yamauchi et al. | 84/602 |
| 6,480,944 B2 * | 11/2002 | Bradshaw et al. | 711/162 |
| 6,697,823 B2 * | 2/2004 | Otsuka et al. | 707/204 |
| 6,769,124 B1 * | 7/2004 | Schoening et al. | 719/316 |

* cited by examiner

*Primary Examiner*—Denise Tran
(74) *Attorney, Agent, or Firm*—Morrison & Foerster LLP

(57) ABSTRACT

An electronic apparatus which is capable of preventing loss of edited operation data even if a user fails to perform a saving operation on the edited operation data. A set of operation data is recalled from either the original storage or the shadow storage to the current storage. Changing of the contents of the operation data stored in the current storage is reflected in the contents of a corresponding set of operation data of the n sets of operation data stored in the shadow storage. When a set of the operation data stored in the current storage is saved, the saved set of operation data is written into a storage area of the original storage and a corresponding storage area of the shadow storage.

21 Claims, 11 Drawing Sheets

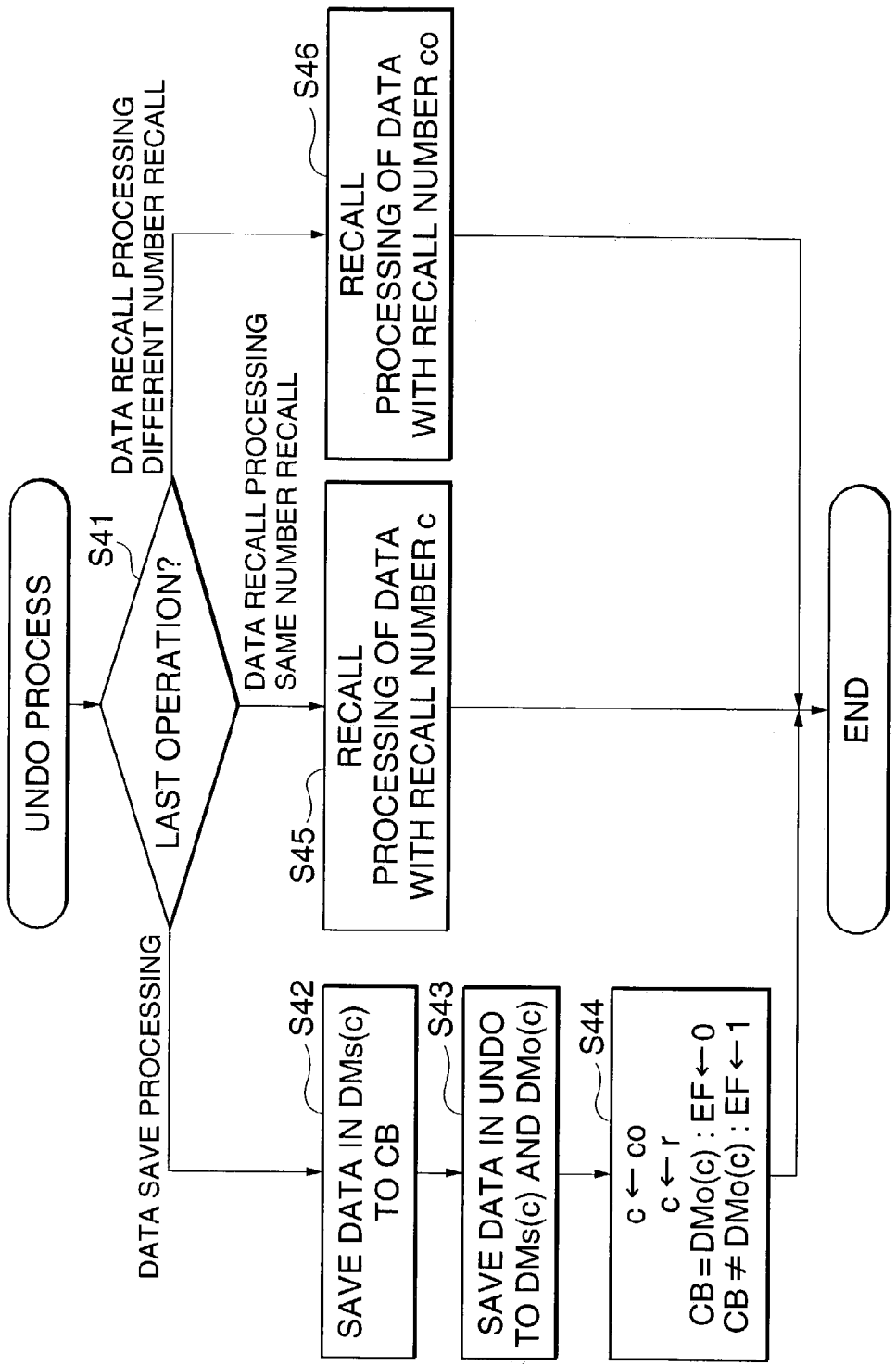

Prior Art

ELECTRONIC APPARATUS AND PROGRAM FOR CONTROLLING COMPUTER

BACKGROUND OF THE INVENTION

1. Field of the Invention

The present invention relates to an electronic apparatus and a program for controlling a computer such as a digital mixer capable of storing a plurality of scenes.

2. Description of Related Art

A digital mixer has been conventionally known which is capable of storing a plurality of scenes or scene selecting events which are contained in automatic data utilized in automixing.

A scene as mentioned above means the whole contents of settings in a digital mixer (or it may be a part thereof), and more specifically, means the contents of various settings such as input patch setting, output patch setting, setting of various input channels, setting of various output channels, setting of stereophonic output channels, setting of a monitor, and setting of a display, etc. In a conventional digital mixer, one of a plurality of scenes prepared in advance may be selected and recalled, so that the whole contents of settings of the selected scene can be set as the current setting of the digital mixer. Further, when one of a plurality of scenes is recalled, the conventional digital mixer can be controlled such that a part of the whole contents of settings of the digital mixer may be selectively omitted from the current setting of the digital mixer.

The above-mentioned automatic data contain a plurality of combinations of events and timing data of the events, and these combinations are stored in a memory in the order of events corresponding to earlier timing. In the reproduction of the automatic data, events are reproduced in timing indicated by the timing data. For example, when a fader operating event indicating a fader number and a fader position is reproduced, control is provided such that a fader designated by the fader number is electrically driven to a position designated by the fader position.

When a scene selecting event as mentioned above is reproduced, settings of a scene designated by the scene selecting event are reproduced on the digital mixer.

With such a digital mixer, settings of a certain scene are to be changed, the scene number is designated to recall the scene, and then various operations are performed on a mixer panel of the digital mixer to change the settings, and then the whole contents of the settings are saved by assigning some scene number thereto.

Now, a scene-saving process and a scene-recalling process in the conventional digital mixer will be described with reference to FIG. 12.

The conventional digital mixer is comprised of a random access memory (RAM) and a central processing unit (CPU), and the RAM is comprised of a plurality of scene saving areas for saving a plurality of prepared scenes, a current area for saving a scene that is used to control the current operation of the digital mixer, and an undo area for enabling the last operation related to a scene to be cancelled.

In the conventional digital mixer, when a user inputs an instruction for saving or storing a scene by designating a scene number, the CPU copies the scene which is stored in a scene saving area corresponding to the designated scene number, to the undo area, and then copies a scene then saved in the current area to the designated scene saving area.

An instruction for storing a scene in the undo area is not permitted.

When the user inputs an instruction for calling, i.e. recalling a scene by designating a scene number, the CPU copies a scene which is saved in the current area to the undo area, and then copies the scene which is saved in a scene saving area corresponding to the designated scene number, to the current area.

When the user inputs an instruction for undo operation, a scene which has been copied to the undo area in the last operation is returned to the original area, and processing reverse to the processing having been performed in the storing or recalling operation is carried out.

Also, an electronic musical instrument has been known which stores a plurality of tone color data, and performs a tone color selecting event, that is, an event for selecting tone color data for use in a piece of music from these tone color data.

However, in the conventional digital mixer as described above, there is a problem that, if a user switches the scene without carrying out a saving operation, the contents of settings in the current area that have been changed are completely lost by the switching. To solve this problem, some digital mixers include an undo buffer for saving the contents of settings immediately before the settings are changed. However, the number of possible undo operations is finite. Particularly in the case where automatic data is incorporated in the digital mixer such that a plurality of scenes are sequentially read out, a saving operation is required to be carried out for each scene, and consequently, an operation error can often occur in which the user fails to save intermediate scenes so that the contents of e changed settings are lost.

In a concert or a stage, the same piece of music may be played for several days, or in different halls or theaters, the same piece of music may be played. In such a case, it is a usual practice that fine adjustment of the contents of settings that have once been completed in a digital mixer (hereinafter referred to as "the original contents of settings") is carried out to adapt them to the hall or the player. If such fine adjustment is repeated, complicated setting operations are required to restore the original contents of settings.

Also, in the above-mentioned conventional electronic instrument which performs the tone color selecting event, for example, if some tone color data is recalled to be edited and then the next tone color data is recalled without saving the previously edited tone color data, the edited tone color data is lost. Thus, there is the same problem as with the conventional digital mixer that the contents of the changed settings are lost.

SUMMARY OF THE INVENTION

It is an object of the present invention to provide an electronic apparatus and a program for controlling a computer, which are capable of preventing loss of edited operation data even if a user fails to perform a saving operation on the edited operation data.

To attain the above object, in a first aspect of the present invention, there is provided an electronic apparatus comprising an operator, a shadow storage that stores n pieces of operation data for controlling operation of the electronic apparatus, a current storage that stores operation data being currently used to control operation of the electronic apparatus and including a piece of operation data as initial data selected from the n pieces of operation data stored in the shadow storage, a changing section responsive to operation of the operator, for changing contents of the operation data stored in the current storage, and a recalling section responsive to operation of the operator, for selecting a piece of operation data as currently selected operation data from the n pieces of operation data stored in the shadow storage that is different from an immediately preceding selected piece of operation data, updating the immediately preceding selected piece of operation data in the shadow storage by the operation data stored in the current storage, and saving the currently selected operation data in the current storage.

With the above arrangement according to the first aspect of the present invention, a piece of operation data in the current storage which may have been edited is automatically saved in a sub area of the shadow storage corresponding to the piece of operation data in the current storage when another piece of operation data is recalled. As a result, even if a user fails to perform saving operation each time, the operation data edited in the current storage is not lost, and the automatic saving to the shadow storage needs to be performed only when the other piece of operation data is recalled.

Preferably, the electronic apparatus according to the first aspect further comprises a switch section that selectively switches the shadow storage such that it is used or not used.

With this arrangement, it is possible to achieve functions of the conventional electronic apparatus since the shadow storage is selectively switched to be used or not.

To attain the above object, in a second aspect of the present invention, there is provided an electronic apparatus comprising an operator, a shadow storage that stores n pieces of operation data for controlling operation of the electronic apparatus, an original storage that stores n pieces of operation data corresponding respectively to the n pieces of operation data stored in the shadow storage, a current storage that stores operation data being currently used to control operation of the electronic apparatus and including a piece of operation data as initial data selected from the n pieces of operation data stored in the shadow storage or in the current storage, a changing section responsive to operation of the operator, for changing contents of the operation data stored in the current storage and changing contents of a piece of operation data of the n pieces of operation data stored in the shadow storage, that corresponds to the operation data stored in the shadow storage, a shadow recalling section responsive to operation of the operator, for selecting a piece of operation data from the n pieces of operation data stored in the shadow storage, and saving the selected piece of operation data in the current storage, and an original recalling section responsive to operation of the operator, for selecting a piece of operation data corresponding to an immediately preceding piece of operation data selected by the shadow recalling section from the operation data stored in the original storage, and saving the selected piece of operation data in the current storage.

With the above arrangement according to the second aspect of the present invention, a piece of operation data edited in the current storage is automatically saved to a sub area of the shadow storage corresponding to the piece of operation data in the current storage, and the piece of original operation data before editing is also saved in the original storage. As a result, even if a user fails to perform saving operation each time, the operation data edited in the current storage is not lost, and the edited operation data can be returned to the original operation data at desired time.

Preferably, in the second aspect, the operator comprises a plurality of operating elements, and the shadow recalling section and the original recalling section operate in response to operation of a same operating element of the operating elements such that the shadow recalling section operates when the operation for selecting a piece of operation data from the n pieces of operation data is first performed, and the original recalling section operates when the operation for selecting a same piece of operation data of the n pieces of operation data is consecutively performed two times.

Preferably, in the second aspect, the operator comprises a plurality of operating elements, and the shadow recalling section and the original recalling section operate in response to operation of a same operating element of the operating elements such that the shadow recalling section and the original recalling section alternately operate in response to operation for consecutively selecting a same piece of operation data from the n pieces of operation data.

Preferably, the electronic apparatus according to the second aspect further comprises a saving section responsive to operation of the operator, for saving the operation data stored in the current storage in the shadow storage and the original storage at a storage location corresponding to the operation data stored in the current storage.

To attain the above object, in a third aspect of the present invention, there is provided an electronic apparatus comprising an operator, a storage that stores n pieces of operation data and n pieces of original operation data corresponding to the n pieces of operation data, a first selector that selects one of the n pieces of operation data as current operation data, a controller that controls the electronic apparatus based on the current operation data, a changing section responsive to operation of the operator, for changing contents of the current operation data stored in the storage, and a second selector responsive to operation of the operator, for selecting, as the current operation data, a piece of original operation data corresponding to the piece of operation data selected by the first selector, in place of the selected piece of operation data.

With the above arrangement according to the third aspect of the present invention, n different pieces of operation data and n pieces of original operation data corresponding to the n pieces of operation data are stored in respective independent areas of the storage. Therefore, even if a piece of operation data selected by the user's operation is changed, this changed operation data remains stored in an independent area storing the selected piece of operation data without performing any special saving operation even if another piece of operation data is selected. Thus, even if the user fails to perform a saving operation on the edited operation data, it is possible to prevent loss of the edited operation data.

Also, since the n pieces of original operation data corresponding to the n pieces of operation data is stored in the storage, the edited operation data can be returned to the original operation data at desired time.

Preferably, the electronic apparatus according to the third aspect further comprises a save section responsive to operation of the operator, for saving the current operation data in the storage at a storage location corresponding to one of the n pieces of operation data stored therein and at a storage location corresponding to one of the n pieces of original operation data stored therein.

To attain the above object, in a fourth aspect of the present invention, there is provided a computer control program executed by a computer including an operator, a shadow storage that stores n pieces of operation data for controlling operation of the computer, and a current storage that stores operation data being currently used to control operation of the computer and including a piece of operation data as initial data selected from the n pieces of operation data stored in the shadow storage, the program comprising a changing module responsive to operation of the operator, for changing contents of the operation data stored in the current storage, and a recalling module responsive to operation of the operator, for selecting a piece of operation data as currently selected operation data from the n pieces of operation data stored in the shadow storage that is different from an immediately preceding selected piece of operation data, updating the immediately preceding selected piece of operation data in the shadow storage by the operation data stored in the current storage, and saving the currently selected operation data in the current storage.

To attain the above object, in a fifth aspect of the present invention, there is provided a computer control program executed by a computer including an operator, a shadow storage that stores n pieces of operation data for controlling operation of the computer, an original storage that stores n pieces of operation data corresponding respectively to the n pieces of operation data stored in the shadow storage, a current storage that stores operation data being currently used to control operation of the computer and including a piece of operation data as initial data selected from the n pieces of operation data stored in the shadow storage or in the current storage, the program comprising a changing module responsive to operation of the operator, for changing contents of the operation data stored in the current storage and changing contents of a piece of operation data of the n pieces of operation data stored in the shadow storage, that corresponds to the operation data stored in the shadow storage, a shadow recalling module responsive to operation of the operator, for selecting a piece of operation data from the n pieces of operation data stored in the shadow storage, and saving the selected piece of operation data in the current storage, and an original recalling module responsive to operation of the operator, for selecting a piece of operation data corresponding to an immediately preceding piece of operation data selected by the shadow recalling module from the operation data stored in the original storage, and saving the selected piece of operation data in the current storage.

To attain the above object, in a sixth aspect of the present invention, there is provided a computer control program executed by a computer including an operator, and a storage that stores n pieces of operation data and n pieces of original operation data corresponding to the n piece of operation data, the program comprising a first selecting module for selecting one of the n pieces of operation data as current operation data, a control module for controlling the computer based on the current operation data, a changing module responsive to operation of the operator, for changing contents of the current operation data stored in the storage, and a second selecting module responsive to operation of the operator, for selecting, as the current operation data, a piece of original operation data corresponding to the piece of operation data selected by the first selecting module, in place of the selected piece of operation data.

To attain the above object, in a seventh aspect of the present invention, there is provided an electronic apparatus comprising an operator, a shadow storage that stores n pieces of operation data for controlling operation of the electronic apparatus, an original storage that stores n pieces of operation data corresponding respectively to the n pieces of operation data stored in the shadow storage, a current storage that stores operation data being currently used to control operation of the electronic apparatus and including a piece of operation data as initial data selected from the n pieces of operation data stored in the shadow storage or in the current storage, an undo storage that stores temporarily a piece of operation data stored in the shadow storage and a piece of operation data stored in the original storage, an input section responsive to operation of the operator, for inputting a saving destination number indicating a saving destination of the operation data stored in the current storage, and a same number storing section that stores in the undo storage, a piece of operation data corresponding to the saving destination number, of the n pieces of operation data stored in the shadow storage and a piece of operation data corresponding to the saving destination number, of the n pieces of operation data stored in the original storage, and then stores a piece of operation data stored in the current storage in the shadow storage at a storage location corresponding to the saving destination number and in the original storage at a storage location corresponding to the saving destination number.

To attain the above object, in a eighth aspect of the present invention, there is provided an electronic apparatus comprising an operator, a shadow storage that stores n pieces of operation data for controlling operation of the electronic apparatus, an original storage that stores n pieces of operation data corresponding respectively to the n pieces of operation data stored in the shadow storage, a current storage that stores operation data being currently used to control operation of the electronic apparatus and including a piece of operation data as initial data selected from the n pieces of operation data stored in the shadow storage or in the current storage, an undo storage that stores temporarily a piece of operation data stored in the shadow storage and a piece of operation data stored in the original storage, an input section responsive to operation of the operator, for inputting a saving destination number indicating a saving destination of the operation data stored in the current storage, a different number storing section that stores in the undo storage a piece of operation data corresponding to the saving destination number, of the n pieces of operation data stored in the shadow storage and a piece of operation data corresponding to the saving destination number, of the n pieces of operation data stored in the original storage, and then stores a piece of operation data stored in the current storage in the shadow storage at a storage location corresponding to the current storage, and in each of the shadow storage and the original storage at a storage location corresponding to the saving destination number.

Preferably, the electronic apparatus according to the seventh aspect further comprises an undo operating section responsive to operation of the operator, for storing a piece of operation data stored in the shadow storage at the storage location corresponding to the saving destination number in the current storage, and then returning the piece of operation data stored in the shadow storage and the piece of operation data stored in the original storage, which were temporarily stored in the undo storage, to the shadow storage and the original storage at respective original storage locations.

To attain the above object, in a ninth aspect of the present invention, there is provided an electronic apparatus comprising an operator, a shadow storage that stores n pieces of operation data for controlling operation of the electronic apparatus, the n pieces of operation data having respective pieces of number data, an original storage that stores n pieces of original operation data corresponding respectively to the n pieces of operation data stored in the shadow storage, respective ones of the n pieces of original operation data having the same number data as the number data of respective corresponding ones of the n pieces of operation data stored in the shadow storage, an input section for inputting number data for designating one of the n pieces of operation data stored in the shadow storage and the n pieces of original operation data stored in the original storage as current operation data, and a selector that selects one piece of the n pieces of operation data stored in the shadow storage and the n pieces of original operation data stored in the original storage as the current operation data based upon the number data inputted by the input section, wherein if the selector selects one piece of the n pieces of operation data stored in the shadow storage as the current operation data, and subsequently number data the same as the number data of the one piece of operation data is inputted by the input section, the selector selects a piece of original operation data having the same number data, as the current operation data.

Preferably, the electronic apparatus according to the ninth aspect further comprises an editor that edits the current operation data, and a copying section that copies a piece of original operation data stored in the original storage to the shadow storage at a storage location corresponding to the piece of original operation data, wherein if the selector selects one of the n pieces of original operation data stored in the original storage as the current operation data, and the editor edits the current operation data, the copying section copies the selected piece of original operation data to the shadow storage at a storage location corresponding to the selected piece of original operation data, and the selector selects the copied piece of original operation data as the current operation data.

Preferably, in the ninth aspect of the electronic apparatus, if the selector selects one of the n pieces of original operation data stored in the original storage as the current operation data, and number data the same as the number data of the selected piece of original operation data is inputted by the input section, the selector selects a piece of operation data having the same number data as the current operation data.

Preferably, in the ninth aspect of the electronic apparatus, if the selector selects one of the n pieces of operation data stored in the shadow storage as the current operation data, and number data that is different from the number data of the selected piece of operation data is inputted by the input section, the selector selects a piece of operation data having the different number data as the current operation data.

Preferably, in the ninth aspect of the electronic apparatus, if the selector selects one of the n pieces of original operation data stored in the original storage as the current operation data, and number data that is different from the number data of the selected piece of original operation data is inputted by the input section, the selector selects a piece of operation data having the different number data as the current operation data.

The above and other objects, features, and advantages of the invention will become more apparent from the following detailed description taken in conjunction with the accompanying drawings.

BRIEF DESCRIPTION OF THE DRAWINGS

FIG. 9 is a flow chart showing an undo process performed by the CPU 1 when a user depresses an UNDO button 95 in the panel operator 9;

DETAILED DESCRIPTION OF THE PREFERRED EMBODIMENTS

The present invention will now be described in detail with reference to the drawings. In first and second embodiments of the present invention described below, the electronic apparatus according to the present invention is applied to a digital mixer. The present invention is, however, not limited to a digital mixer, but can be applied to other kinds of apparatuses, such as an electronic musical instrument.

Figure 1:
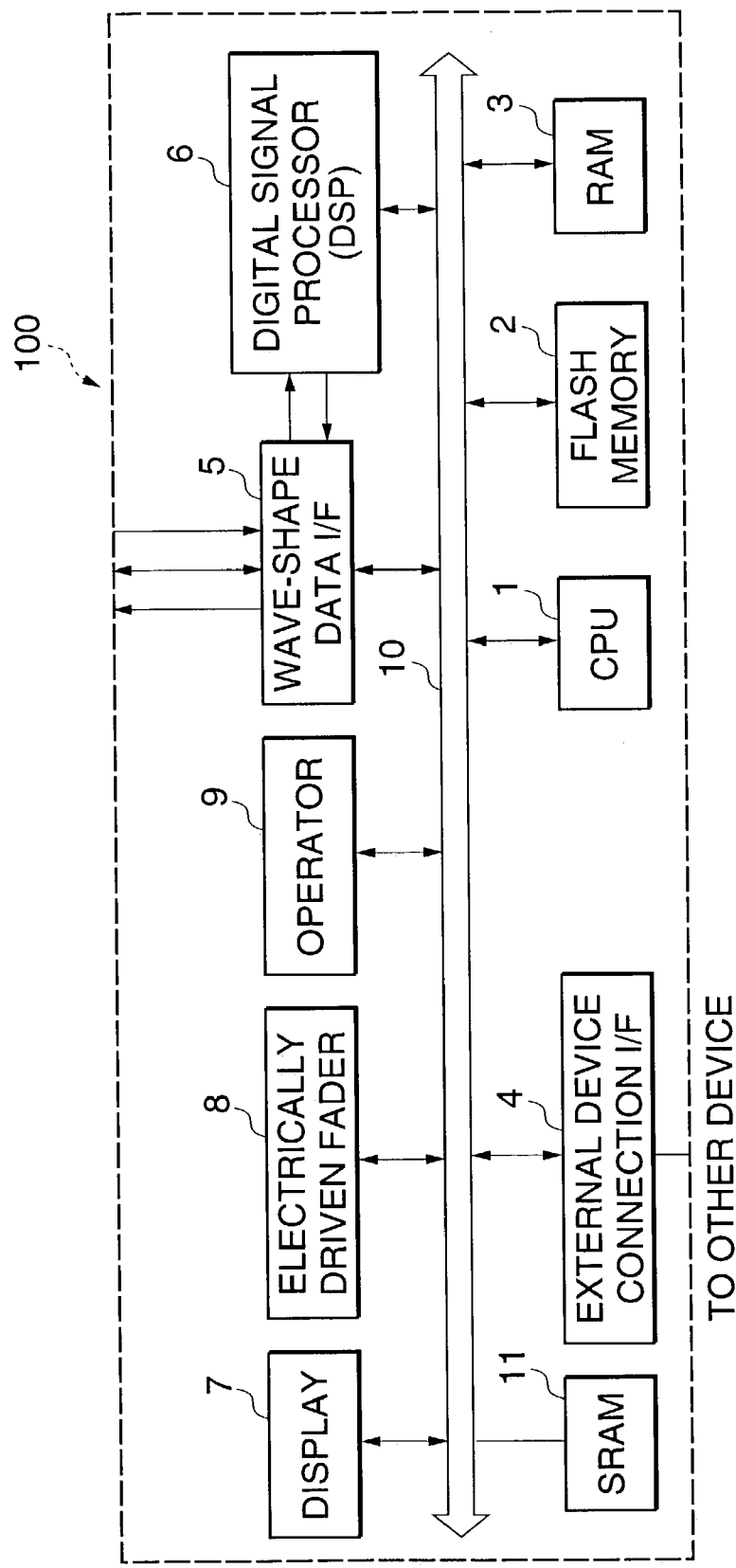
FIG. 1 is a schematic diagram showing the construction of a digital mixer as an electronic apparatus according to a first embodiment of the present invention.

FIG. 1 is a schematic view showing the construction a digital mixer as the electronic apparatus according to the first embodiment of the present invention.

In FIG. 1, the digital mixer 100 is comprised of a central processing unit (CPU) 1 that controls the operation of the digital mixer 100 as a whole, and generates a mixing control signal according to a mixing operation, a rewritable non-volatile flash memory 2 that stores operation software such as a mixing control program to be executed by the CPU 1, and a random access memory (RAM) 3 that provides a work area for the CPU 1 and stores various data. Since the operation software for the digital mixer 100 is thus stored in the flash memory 2, if the operation software is to be upgraded, the operation software stored in the flash memory 2 has only to be rewritten. The digital mixer 100 is further comprised of an external device connection interface (I/F) 4 which serves as a connection terminal for connecting computers and external storage devices such as a hard disk drive, which are not shown, an input terminal for control signals, and a time code terminal, a waveform data interface (I/F) 5 for inputting and outputting analog audio signals and digital audio signals, and a signal processor 6 which is composed of a plurality of digital signal processors (DSPs) and which performs mixing processing on the signals input through the waveform data I/F 5 under the control of the CPU 1 and outputs the signals subjected to the mixing processing to the waveform data I/F 5.

The digital mixer 100 is further comprised of a liquid crystal display 7 which is capable of displaying the level of digital signals in the form of a bar graph at each stage of mixing and is also capable of automatically switching a display screen according to changes in parameters changed by operating a panel operator 9, a fader 8 which adjusts the level of signals to be sent to a mixing bus in the signal processor 6 as well as the output level of a signal after mixing, the panel operator 9 which is comprised of a plurality of operating elements for setting or changing equalizing characteristics, panning characteristics and the like of various signals, and for switching scenes, a bus 10 which is a common path for exchanging data between blocks, and a non-volatile SRAM 11 (backed up by a battery) which stores data such as scenes of the digital mixer.

The fader 8 can be operated manually or electrically to perform the level adjusting operation. It is electrically operated when the signal level is set using velocity in a read-out scene or in a MIDI message. The fader 8 is driven according to the set signal level such that a knob thereof is automatically moved so as to set the desired level.

Figure 2:
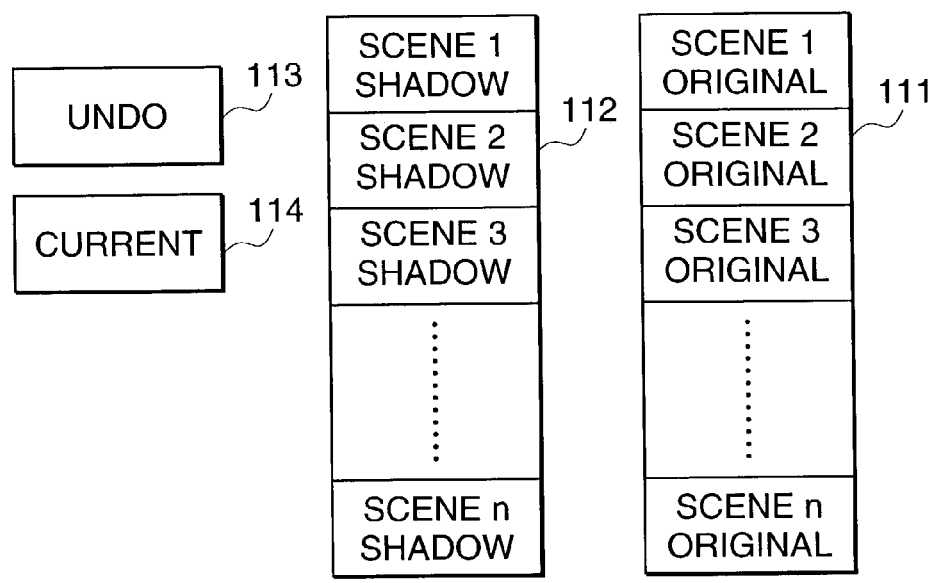
FIG. 2 is a schematic diagram showing the construction of a SRAM 11 in FIG. 1.

As shown in FIG. 2, the SRAM 11 has a plurality of areas that each contain a scene or scenes corresponding respectively to scene numbers. That is, the SRAM 11 is comprised of an original area 111 that saves a plurality of scenes that have been once completed, a shadow area 112 that saves a plurality of partially edited scenes corresponding respectively to scene numbers in the same manner as in the original area 111, an undo area 113 for saving a scene for canceling the last operation related to a scene, and a current area 114 that saves a scene which controls the present operation of the digital mixer.

The original area 111 and the shadow area 112 are each subdivided into a plurality of sub areas for saving a plurality of scenes. The undo area 113 has two sub areas, one for the original area and the other for the shadow area, for saving scenes in the original area 111 and in the shadow area 112 separately in order to return these scenes to respective previous scenes when an undo operation as described later is performed.

Referring again to FIG. 1, the external device connection interface (I/F) 4 permits external storage devices such as a hard disk drive, a floppy disk drive, a magneto optical disk (MO) drive to be connected thereto. When such an external storage device is connected, a plurality of scenes saved in the original area 111 and in the shadow area 112 of the SRAM 11 can be saved in the external storage device as files. To save scenes in the external storage device, scenes saved, respectively, in the original area 111 and in the shadow area 112 are saved together as a group. For example, a scene A saved in a sub area corresponding to a number #01 of the original area 111 and a scene B saved in a sub area corresponding to the number #01 of the shadow area 112 are saved together in the external storage device.

Figure 3:
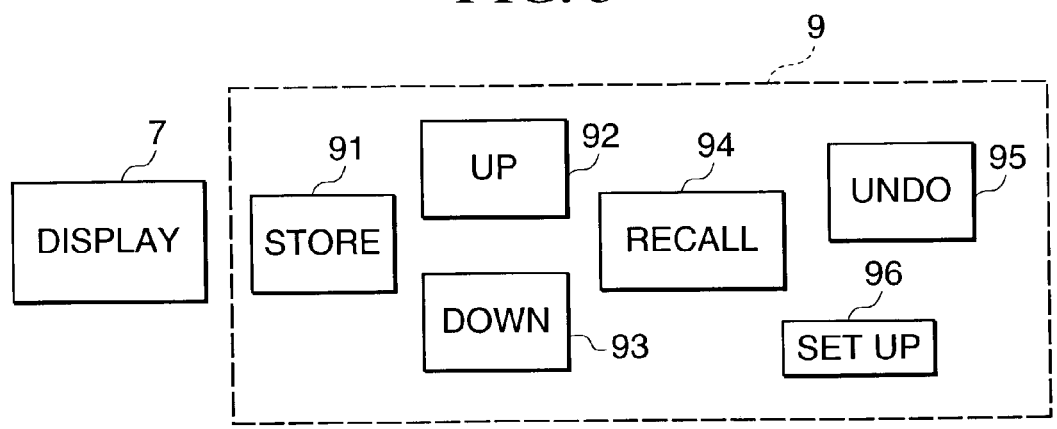
FIG. 3 is a schematic diagram showing a display 7 in FIG. 1 and component parts of a panel operator 9 in FIG. 1.

FIG. 3 is a diagram schematically showing the display 7 in FIG. 1 and component parts of the panel operator 9 in FIG. 1.

The panel operator 9 is comprised of a STORE button 91 for inputting an instruction for saving a scene in the original area 111 of the SRAM 11, a RECALL button 94 for inputting an instruction for recalling a scene saved in the original area 111 or in the shadow area 112, an UP button 92 and a DOWN button 93 for inputting an instruction for increasing or decreasing a scene number displayed on the display 7, an UNDO button 95 for inputting an undo instruction, and a SETUP button 96 for setting whether to use the shadow area 112 of the SRAM 11 or not.

The display 7 displays a scene number that is increased or decreased by the UP button 92 and DOWN button 93, and also displays an EDIT mark that is lit when there is a difference between the current scene saved in the current area 114 and the scene saved in the corresponding original area 111.

When a user depresses the SETUP button 96, a plurality of menus are displayed on the display 7, and in a PREFERENCE menus it is possible to select whether or not the shadow area 112 in THE SRAM 11 is to be used. If the shadow area 112 is not to be used, the digital mixer 100 performs the same processing operation as in the conventional digital mixer. That is, if the user wishes the conventional scene operation as before, the digital mixer can be set so as not to use the shadow area 112 (a scene is not saved until it is stored). If the shadow area 112 is used during recording in Automix mode, when the user operates the fader or the like to perform a different number recalling operation of a scene, hereinafter described, to record an operation, a scene stored in the current area 114 just before the different-number recalling operation is performed is saved in a sub area of the shadow area 112 corresponding to a scene number designated before the different number recalling operation. Similarly, during the reproduction in Automix mode, if a scene recalling operation is performed after reproduction of a scene after a scene change by a fader movement, the scene after the scene change in the current area 114 is saved in a sub area of the shadow area 112 corresponding to a scene number designated before the recalling operation. To avoid such an inconvenience, the digital mixer is automatically set so as not to use the shadow area 112 during recording or reproduction in Automix mode.

When the user selects a desired scene number using the UP button 92 or DOWN button 93 and operates the STORE button 91, the CPU 1 performs (stores) processing for saving a scene stored in the current area 114 to a sub area of the original area 111 corresponding to the selected scene number. When the user selects a desired scene number using the UP button 92 or DOWN button 93 and operates the RECALL button 94, the CPU 1 performs (recalls) processing for recalling a scene stored in a sub area of the original area 111 corresponding to the selected scene number to the current area 114. The storing processing and the recalling processing will be described below with reference to FIGS. 4–9.

In the following description, the term "store" refers to the case where the user saves an edited scene, and the term "recall" refers to the case where the user recalls a stored scene. If, after a recalling (or storing) operation is performed on a scene of a certain scene number, #01 for example, a storing operation is performed to store a scene in a sub area of the original area 111 corresponding to the same scene number, that is, #01, irrespective of whether or not an edition has been performed to edit a scene in the current area 114 using the fader or the like, the operation will be referred to as the same number storing operation. If, after a recalling (or storing) operation is performed on a scene of a certain scene number, #01 for example, a storing operation is performed on a scene of a different scene number, #02 for example, the operation will be referred to as the different number storing operation. If, after a recalling (or storing) operation is performed on a scene of a certain scene number, #01 for example, a recalling operation is performed in a scene of the same scene number, that is, #01, the operation will be referred to as the same number recalling operation. If, after a recalling (or storing) operation is performed on a scene of a certain scene number, #01 for example, a recalling operation is performed on a scene of a different scene number, #02 for example, the operation will be referred to as the different number recalling operation.

Figure 4A:
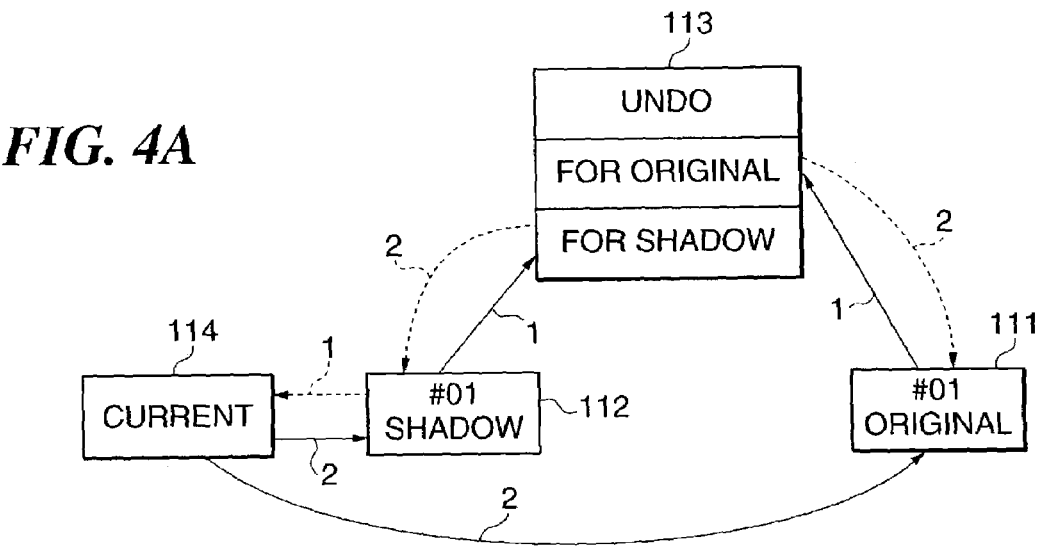
FIG. 4A is a diagram showing from which area to which area a scene is copied when a same number storing operation is performed with a scene number #01 as indicating the storing destination.
Figure 4B:
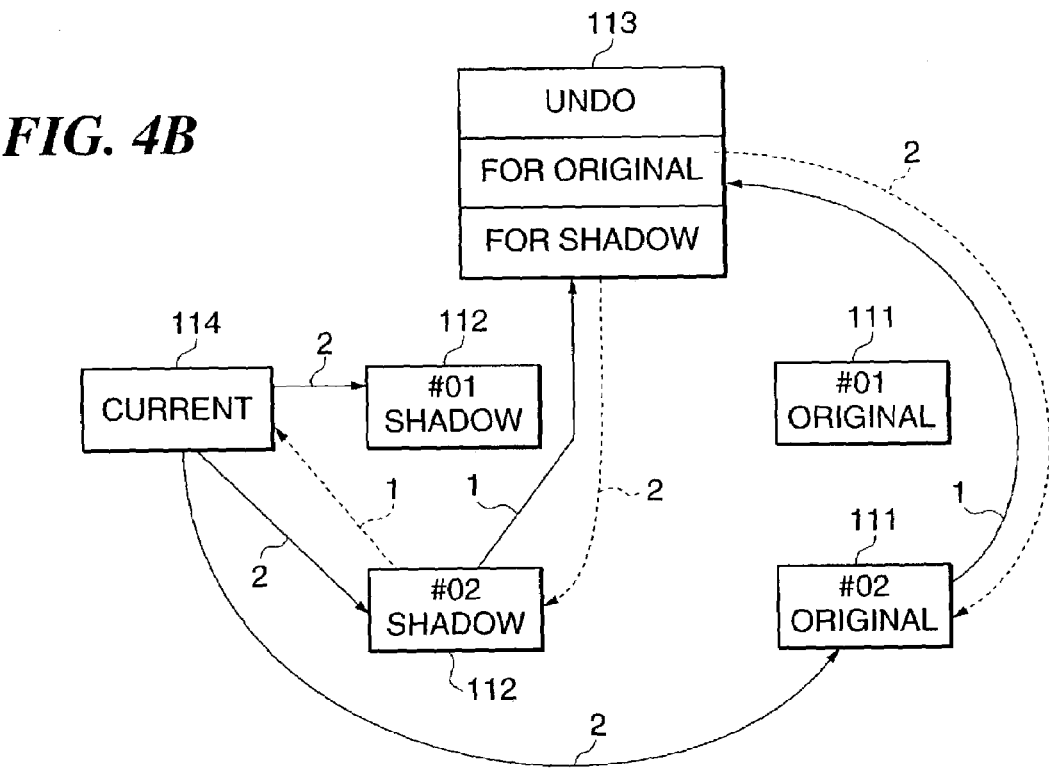
FIG. 4B is a diagram showing from which area to which area a scene is copied when a different number storing operation is performed with the scene number #01 as indicating the current scene and with a scene number #02 as indicating the storing destination.

FIG. 4A is a diagram showing from which area to which area a scene is copied when the same number storing operation is performed with the scene number #01 as indicating the storing destination. FIG. 4B is a diagram showing from which area to which area a scene is copied when the different number storing operation is performed with the scene number #01 as indicating the current scene and with the scene number #02 as indicating the storing destination;

In these figures, the arrows in solid lines each indicate from which area to which area a scene is copied when a storing instruction is input to the CPU 1, and the numbers indicate the order of copy processing. The arrows in dotted lines each indicate from which area to which area a scene is copied when an undo instruction is input to the CPU 1, and the numbers indicate the order of copy processing.

As shown in FIGS. 4A and 4B, irrespective of whether the same number storing operation or the different number storing operation is performed, a scene saved in the current area 114 is saved (copied) in a sub area (#01) of the original area 111 and a sub area (#01) of the shadow area 112.

Figure 5A:
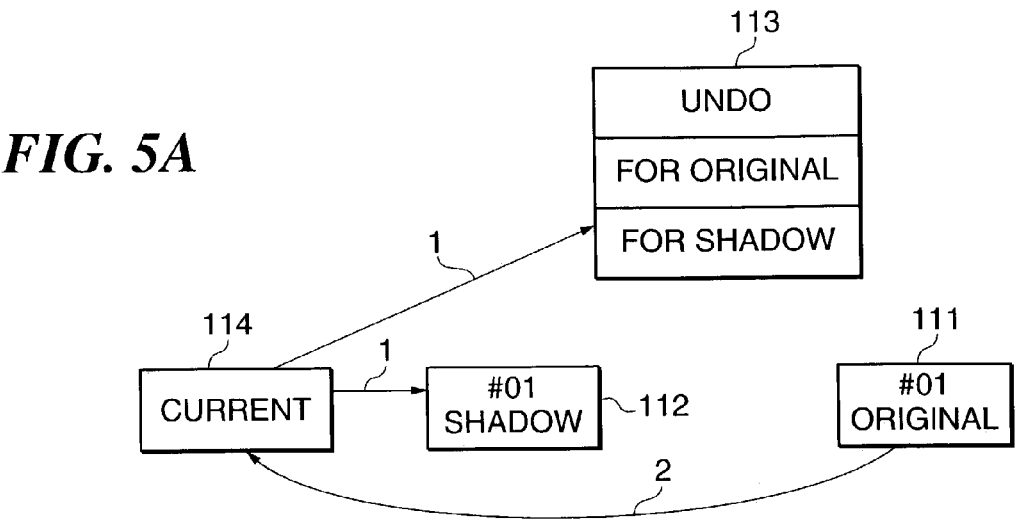
FIG. 5A is a diagram showing from which area to which area a scene is copied when a same number recalling operation for the scene number #1 is performed with the scene number #01 indicating the current scene and with a scene in a current area 114 being different from a scene in an original area 111 corresponding to the scene number #01 (EDIT mark ON)
Figure 5B:
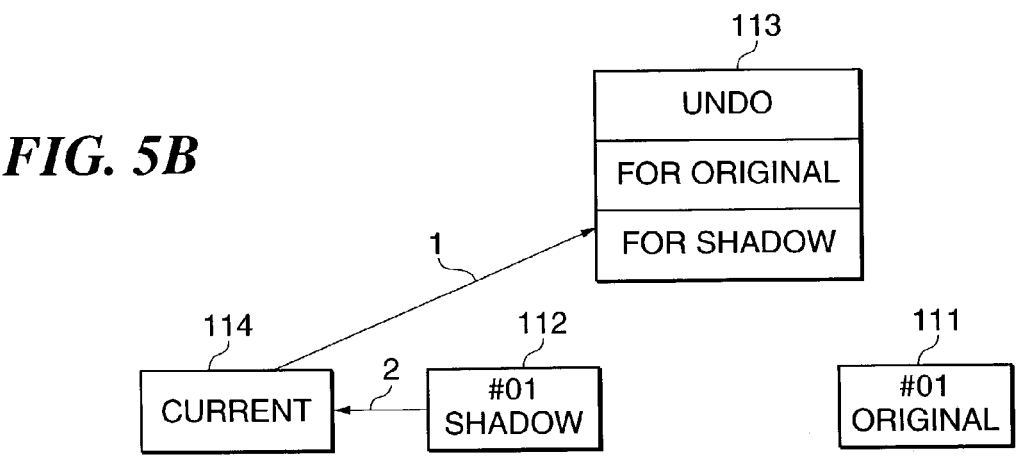
FIG. 5B is a diagram showing from which area to which area a scene is copied when the same number recalling operation for the scene number #01 is performed with the scene number #01 indicating the current scene and with the scene in the current area 114 being the same as the scene in the original area 111 corresponding to the scene number #01 (EDIT mark OFF)
Figure 5C:
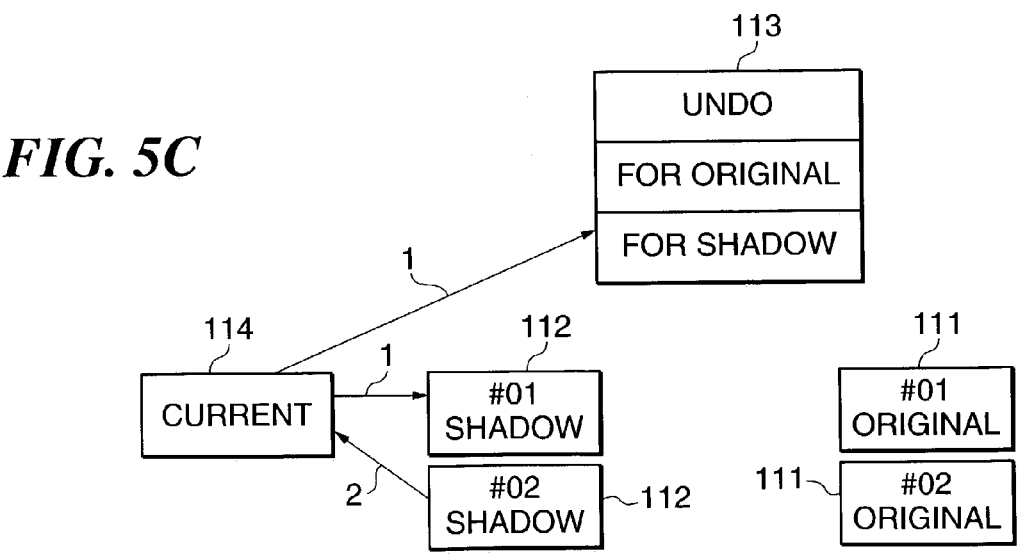
FIG. 5C is a diagram showing from which area to which area a scene is copied when a different number recalling operation for the scene number #02 is performed with the scene number #01 indicating the current scene.

FIG. 5A is a diagram showing from which area to which area a scene is copied when the same number recalling operation for the scene number #1 is performed with the scene number #01 indicating the current scene and with a scene in the current area 114 being different from a scene in the original area 111 corresponding to the scene number #01 (EDIT mark ON). FIG. 5B is a diagram showing from which area to which area a scene is copied when the same number recalling operation for the scene number #01 is performed with the scene number #01 indicating the current scene and with the scene in the current area 114 being the same as the scene in the original area 111 corresponding to the scene number #01 (EDIT mark OFF). FIG. 5C is a diagram showing from which area to which area a scene is copied when the different number recalling operation for the scene number #02 is performed with the scene number #01 indicating the current scene.

In these figures, the arrows in solid lines each indicate from which area to which area a scene is copied when a recalling instruction is input to the CPU 1, and the numbers indicate the order of copy processing.

As shown in FIG. 5A, when a scene saved in the current area 114 is different from a scene saved in the sub area (#01) of the original area 111, the scene saved in the sub area (#01) of the original area 111 is saved (copied) in the current area 114 by the same number recalling operation, and if the same number recalling operation is performed again, since the scene saved in the current area 114 is the same as the scene saved in the sub area (#01) of the original area 111, a scene saved in the sub area (#01) of the shadow area 112 is saved (copied) in the current area 114, as shown in FIG. 5B. If the same number recalling operation is further performed, since the scene saved in the current area 114 is different from the scene saved in the sub area (#01) of the original area 111, the scene saved in the original area 111 is saved (copied) in the current area 114, as shown in FIG. 5A. Thus, en a scene saved in the current area 114 is different from a scene saved in the sub area (#01) of the original area 111, if the same number recalling operation is repeatedly performed, the scene saved in the sub area (#01) of the original area 111 and a scene saved in the sub area (#01) of the shadow area 112 are alternately saved in the current area 114. Therefore, it is possible to recall a scene saved in a sub area of the original area 111 and a scene saved in a sub area of the shadow area 112 alternately to the current area 114. When scenes saved in a sub area of the original area 111 and in a sub area of the shadow area 112 are different from each other, the EDIT mark is put out when the scene in the sub area of the original area 111 is recalled to the current area 114, and the EDIT mark is lighted when the scene in the sub area of the shadow area 112 is recalled to the current area 114. Therefore, by watching the EDIT mark, it is possible to check whether scenes in the sub area of the original area 111 and the sub area of the shadow area 112 are the same as each other or not, and to determine which of the scenes in the sub area of the original area 111 and the sub area of the shadow area 112 is being recalled to the current area 114.

It should be noted that when the same number recalling operation is performed for a scene number for which scenes in the sub area of the original area 111 and in the sub area of the shadow area 112 are the same, each of the scenes in the current area 114, the shadow area 112 and the original area 111 does not change after the recalling operation from the state before the recalling operation. In this case, copy processing as shown in FIGS. 5A and 5B may be omitted, since the scenes do not change irrespective of whether the copy processing is performed or not. In FIGS. 5A–5C, since a scene which is the same as the scene copied to the sub area for the shadow area of the undo area 113 is left in areas other than the undo area 113 i.e., the shadow area 112 and the original area 111, copy processing to the undo area 113 may be omitted and the left scene may be used for the undo processing.

Figure 6:
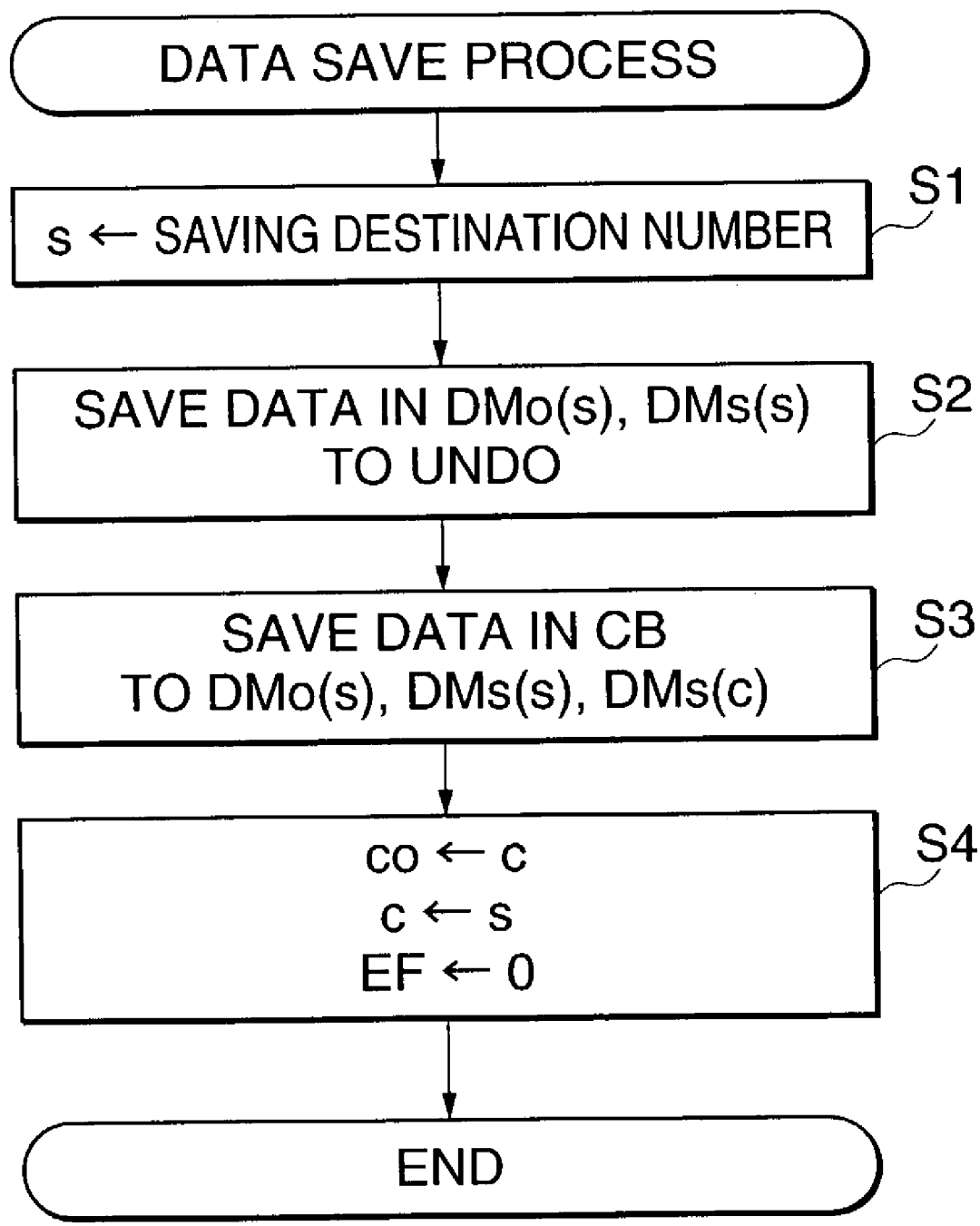
FIG. 6 is a flow chart showing a data saving process performed by a CPU 1 when the same number storing operation or the different number storing operation is performed.

Next, a data saving process performed by the CPU 1 when the same number storing operation or the different number storing operation is performed will be described with reference to a flow chart shown in FIG. 6.

First, when the user operates the panel operator 9 to input to the display a saving destination number indicating a saving destination for an edited scene in the current area 114, and depresses the STORE button 91, the saving destination number is set to an area "s" for saving the saving destination number in the RAM 3 (step S1). Here, the saving destination number means the scene number, for example, #01, #02, of the original area 111 and the shadow area 112 where the scene is to be saved.

Next, a scene, which is saved in the original area 111 and corresponds to the saving destination number input in the step S1, is saved in the sub area for the original area of the undo area 113, and a scene, which is saved in the shadow area 112 and corresponds to the saving destination number input in step S1, is saved in the sub area for the shadow area of the undo area 113 (step S2). Here, "DMo(s)" indicated in the flow chart of FIG. 6 means a sub area of the original area 111 corresponding to the saving destination number, and "DMs(s)" means a sub area of the shadow area 112 corresponding to the saving destination number. The above processing in the step S2 corresponds to the processing indicated by the solid lines 1 in FIGS. 4A and 4B.

Next, when the different number storing operation is performed, a scene saved in the current area 114, which is used to control the current operation of the digital mixer, is saved in the sub area of the original area 111 corresponding to the saving destination number, and in the sub area of the shadow area 112 corresponding to the saving destination number, and in the sub area of the shadow area 112 corresponding to a current number (step S3). Here, "c" indicated in the flow chart means the area for saving the current number in the RAM 3. The current number means a scene number for the original area 111 and the shadow area 112 corresponding to a scene in the current area 114. Thus, if the scene being currently edited corresponds to the scene number #01, the current number is #01. "DMs(c)" indicated in the flow chart means the sub area of the shadow area 112 corresponding to the current number. This processing in the step S3 corresponds to the processing indicated by the solid lines 2 in FIG. 4B.

When the same number storing operation is performed, since the saving destination number is the same as the current number, in the step S3 an edited scene saved in the current area 114 is saved only in the sub area of the original area 111 corresponding to the saving destination number and in the sub area of the shadow area 112 corresponding to the saving destination number. This processing in the step S3 corresponds to the processing indicated by the solid lines 2 in FIG. 4A.

Finally, the current number is saved in an area "co" of the RAM 3, which is for saving an immediately proceeding current number (co←c), and the same number as the saving destination number is set to the current number (c←s), and an edit flag is set to 0 (EF←0) (step S4) to terminate the present processing.

The current number is saved in the area "co" because otherwise the immediately preceding current number becomes unclear, making it impossible to perform undo processing. The saving destination number is set to the current number because the user can easily find the saved edited scene to recall it later. The setting of the saving destination number to the current number may be omitted and the immediately preceding current number may continue to be used after the saving processing. The edit flag is used to display the lighting status of the EDIT mark, and is set to 1 when the scene being edited and saved in the current area 114 is different from the scene saved in the original area 111 corresponding to the current number, and is set to 0 when the two scenes are identical with each other.

Next, a data recalling process performed by the CPU 1 when when the same number recalling operation or the different number recalling operation is performed will be described with reference to a flow chart shown in FIG. 7.

The data recalling process is comprised of three processes as follows: (i) data recalling processing performed when the different number recalling operation is performed (steps S13–S15); (ii) data recalling processing performed when a scene saved in the current area 114 is the same as a scene saved in the original area 111 corresponding to the current number and the same number recalling operation is performed (steps S17–S19); and (iii) data recalling processing performed when the scene saved in the current area 114 is different from the scene saved in the original area 111 corresponding to the current number and the same number recalling operation is performed (steps S20–S22).

These processes will be specifically described below.

First, when the user operates the UP button 92 or DOWN button 93 to cause the display 7 to display a desired scene number and depresses the RECALL button 94, the desired scene number is set in an area "r" for saving a recall number in the RAM 3 (step S11). Here, the recall number means a scene number corresponding to sub areas of the original area 111 and the shadow area 112, in which the scene the user wants to recall is saved, for example, #01, #02.

Next, it is determined whether or not the recall number set in the step S11 is the same as the current number (step S12). Here, it is determined whether the same number recalling operation is being performed or not.

(i) Data recalling processing performed when the different number recalling operation is performed (steps S13–S15).

If it is determined in step S12 that the recall number is not the same as the current number, that is, the different number recalling operation is being performed, the scene saved in the current area 114 is saved in the sub area of the shadow area 112 corresponding to the current number and in the sub area for the shadow area of the undo area 113 (step S13). This processing in the step S13 corresponds to the processing shown by the solid lines 1 in FIG. 5C.

Then, the scene saved in the sub area of the shadow area 112 corresponding to the recall number is saved in the current area 114 (step S14). This processing in step S14 corresponds to processing shown by the solid line 2 in FIG. 5C.

Finally, the current number is saved in the area "co" for saving the immediately current number in the RAM 3 (co←c), and the same number as the recall number is set to the current number (c←r), and if the scene saved in the current area 114 and the scene saved in the corresponding sub area of the original area 111 are the same, the edit flag is set to 0 (EF←0), and if the two scenes are different from each other, the edit flag is set to 1 (EF←1) (step S15), and the present processing is terminated.

(ii) Data recall processing performed when a scene saved in the current area 114 is the same as a scene saved in a sub area of the original area 111 corresponding to the current number and the same number recalling operation is performed (steps S17–S19).

If the result of the determination in the step S12 is that the recall number is the same as the current number, that is, that the same number recalling operation is being performed, then it is determined whether or not the edit flag is set to 1 (step S16).

If it is determined in the step S16 that the edit flag is not set to 1, that is, the edit flag is set to 0, the scene saved in the current area 114 is saved in the sub area for the shadow area of the undo area 113 (step S17). This processing in the step S17 corresponds to the processing shown by the solid line 1 in FIG. 5B.

Next, the scene saved in the shadow area 112 corresponding to the current number is saved in the current area 114 (step S18). This processing in the step S18 corresponds to the processing shown by the solid line 2 in FIG. 5B.

Finally, if the scene saved in the current area 114 and the scene saved in the original area 111 corresponding to the current number are the same as each other, the edit flag is set to 0 (EF←0), and if the scenes are different from each other, the edit flag is set to 1 (EF←1) (step S19), and the present processing is terminated.

(iii) Data recall processing performed when a scene saved in the current area 114 is different from a scene saved in the original area 111 corresponding to the current number and the same number recalling operation is performed (steps S20–S22).

If the result of the determination in the step S16 is that the edit flag is set to 1, the scene saved in the current area 114 is saved in the sub area of the shadow area 112 corresponding to the current number, and in the sub area for the shadow area of the undo area 113 (step S20). This processing in step the S20 corresponds to the processing shown by the solid lines 1 in FIG. 5A.

Next, the scene saved in the original area 111 corresponding to the current number is saved in the current area 114 (step S21). This processing in the step S21 corresponds to the processing shown by the solid line 2 in FIG. 5A.

Finally, since the scene saved in the current area 114 is the same as the scene saved in the original area 111 corresponding to the current number, the edit flag is set to 0 (EF←0) (step S22), and the present processing is terminated.

Figure 8:
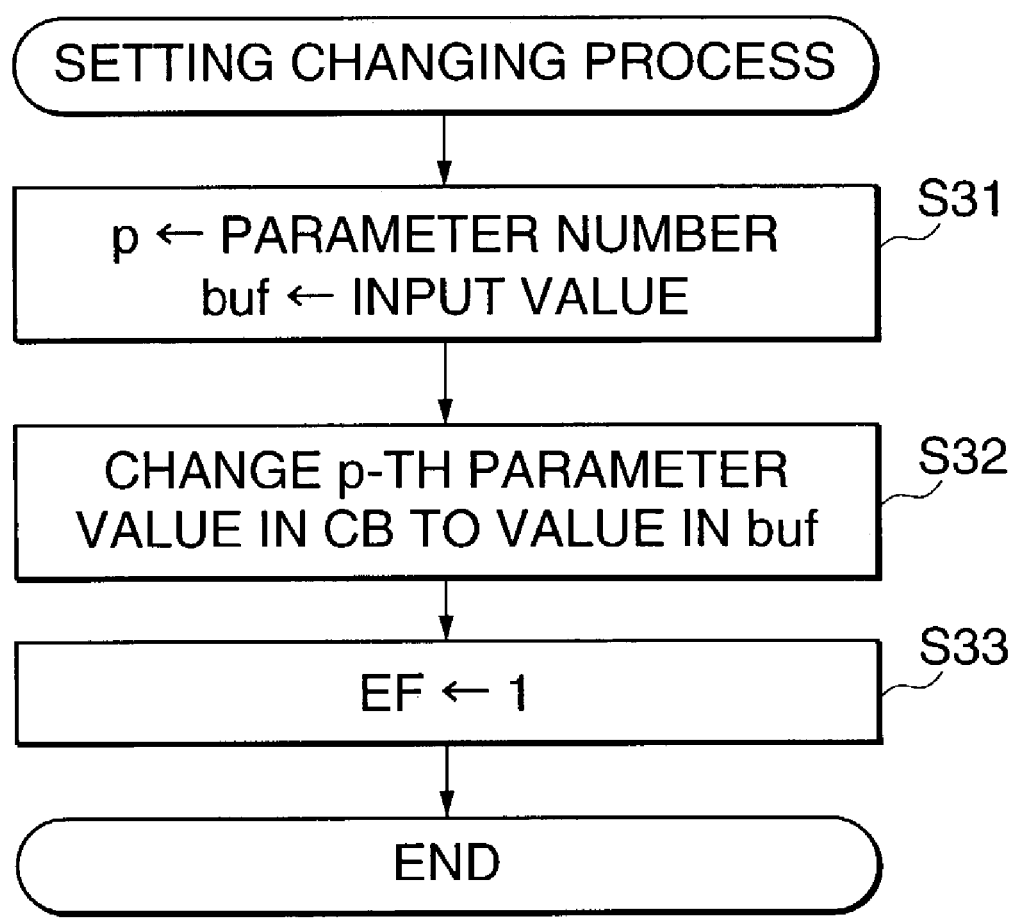
FIG. 8 is a flow chart showing a setting value changing process performed by the CPU 1 when a user operates a fader 8 and the panel operator 9 to change the values of parameters composing the scene.

Next, a setting changing process performed by the CPU 1 when the user operates the fader 8 or the panel operator 9 to change the values of parameters composing a scene will be described with reference to a flow chart in FIG. 8.

First, when the user operates the fader 8 or the panel operator 9 to change the value of a parameter composing a scene, the CPU 1 sets the number of a parameter corresponding to the operated fader 8 or panel operator 9 in an area "p" for saving the parameter number in the RAM 3, and sets the output value of the fader 8 or the panel operator 9 in an area "buf" in the RAM 3 (step S31).

Next, the CPU 1 changes the value of the parameter composing a scene saved in the current area 114, which is the value of the parameter corresponding to the parameter number set in the area "p" in the step S31, to the value set in the area "buf" in the step S31 (step S32).

Finally, the CPU 1 sets the edit flag to 1 (EF←1) (step S33), and the present processing is terminated.

Next, an undo process performed by the CPU 1 when the user depresses the UNDO button 95 of the panel operator 9 will be described with reference to a flow chart shown in FIG. 9.

First, it is determined in step S41 whether the immediately preceding operation is the data saving process, the data recall processing of the same number recalling operation, or the data recall processing of the different number recalling operation. To carry out this determination, the CPU 1 saves a history of operations performed in the past in the RAM 3 or the like, for example.

If it is determined in the step S41 that the immediately preceding operation is the data saving process, a scene saved in a sub area of the shadow area 112 corresponding to the current number is saved in the current area 114 (step S42).

Next, a scene saved in the sub area for the shadow area of the undo area 113 is saved in sub areas of the shadow area 112 and the original area 111 corresponding to the current number (step S43).

Finally, a number saved in the area "co" is set in the area "c", that is, the immediately preceding current number is set as a new current number. Further, if the scene saved in the current area 114 and the scene saved in the original area 111 corresponding to the current number are the same, the edit flag is set to 0 (EF←0), and if the two scenes are different from each other, the edit flag is set to 1 (EF←1) (step S44), and the present processing is terminated.

Figure 7:
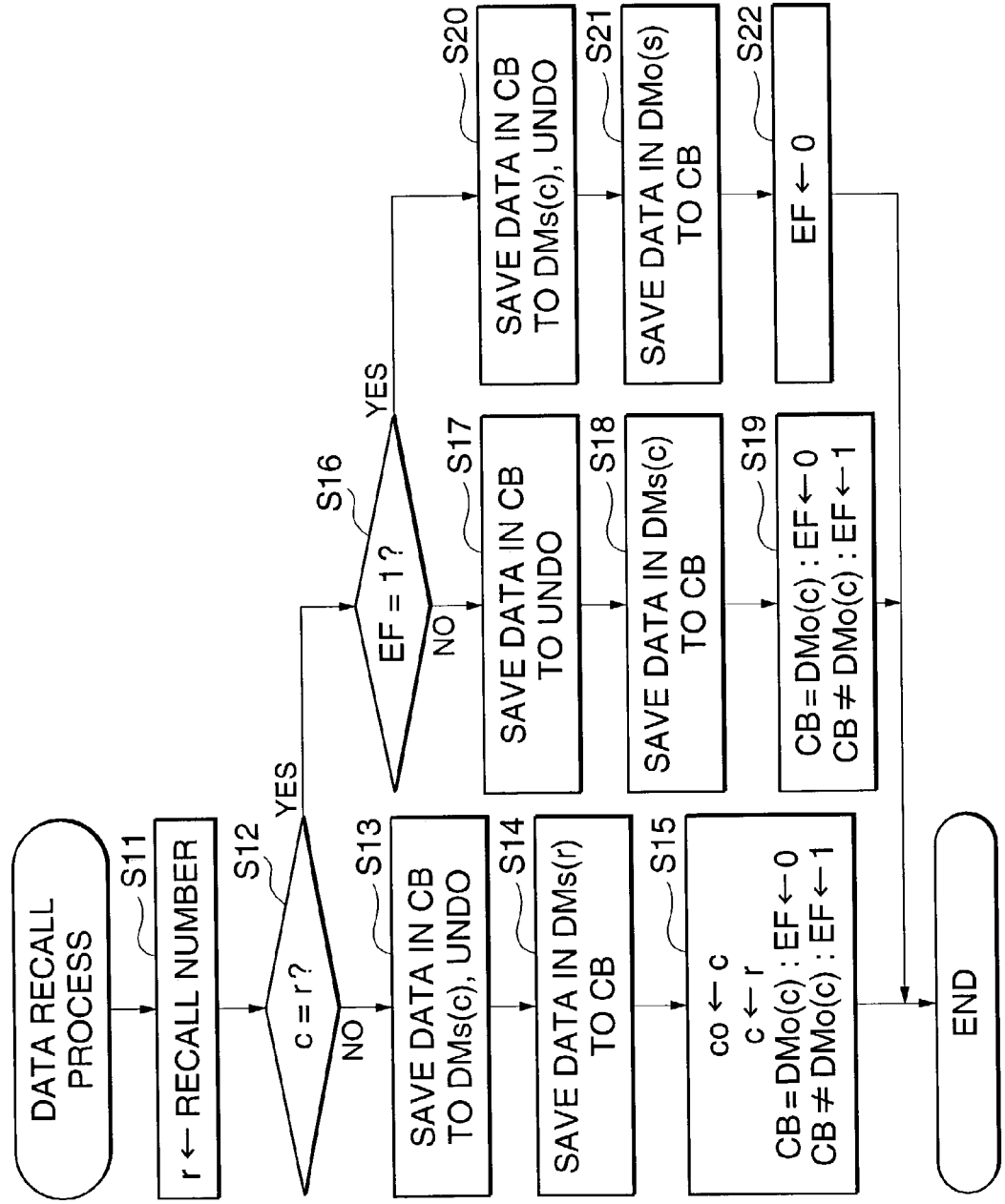
FIG. 7 is a flow chart showing a data recalling process performed by the CPU 1 when the same number recalling operation or the different number recalling operation is performed.

Next, if it is determined in the step S41 that the immediately preceding operation is the data recall processing of the same number recalling operation, the current number in the area "c" is set to the recall number, and the data recalling process of FIG. 7 is carried out (step S45), and the present processing is terminated. Here, the reason why the current number is set to the recall number and the data recalling processing of FIG. 7 is carried out as the undo processing is that the object of the undo process is attained if the scene saved in the shadow area 112 corresponding to the immediately preceding current number is saved in the current area 114.

Finally, if it is determined as a result of the determination in the step S41 above that the immediately preceding processing is the data recall processing of different number recall, the immediately preceding current number stored in the area "co" is set to the recall number, and the data recall processing shown in FIG. 7 is performed (step S46), and the present processing is terminated. Here, the immediately preceding current number is set to the recall number and the data recall processing shown in FIG. 7 is performed as the undo processing because an object of the undo processing is attained if the scene saved in the shadow area 112 corresponding to the immediately preceding current number is saved in the current area 114.

As described above, according to the present embodiment, when a scene of a scene number different from the scene number of the current area 114 stored in the area "c" is recalled, the scene stored in the current area 114 is automatically saved in the sub area of the shadow area 112 corresponding to the scene number of the area "c". As a result, even if a scene in the current area is edited, loss of the edited scene can be avoided. Also, in each sub area of the original area 111 corresponding to each scene number, an original scene before edition of a scene saved in each sub area of the shadow area 112 corresponding to the same scene number is saved. As a result the user can restore the scene stored in each sub area of the shadow area corresponding to each scene number to the original scene.

Next, a description will be given of an electronic apparatus according to a second embodiment of the present invention. The second embodiment is different from the first embodiment described above in that it does not include the current area 114. Otherwise, the construction is identical with that of the first embodiment, and therefore description thereof is omitted.

In the present embodiment, a current pointer is used to edit a scene in place of the current area 114, and the original area 111 or the shadow area 112 designated by the current pointer is used as the current area in which a scene used to control the current operation of the digital mixer is saved. Thus, the processing for copying a scene saved in the current area 114 to the original area 111 or to the shadow area 112, and the processing for copying a scene saved in the original area 111 or in the shadow area 112 to the current area 114 is omitted. Since the amount of processing for copying scenes as data is thus decreased, the processing speed can be increased. It becomes also possible to allot the current area 114 of the SRAM 11 to another area.

However, since the original area 111 is not an area for editing a scene, when the original area 111 is designated by the current pointer as the current area and the fader 8 or the panel operator 9 is operated, a scene saved in the original area 111 is copied to the shadow area 112, and edition of the copied scene in the shadow area 112 is carried out.

Figure 10A:
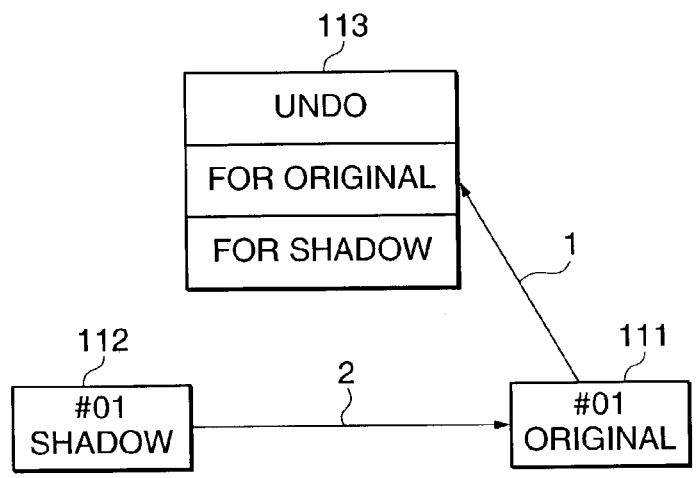
FIG. 10A is a diagram showing to which areas scenes saved in respective areas are saved when the same number storing operation is performed according to a second embodiment of the present invention.
Figure 10B:
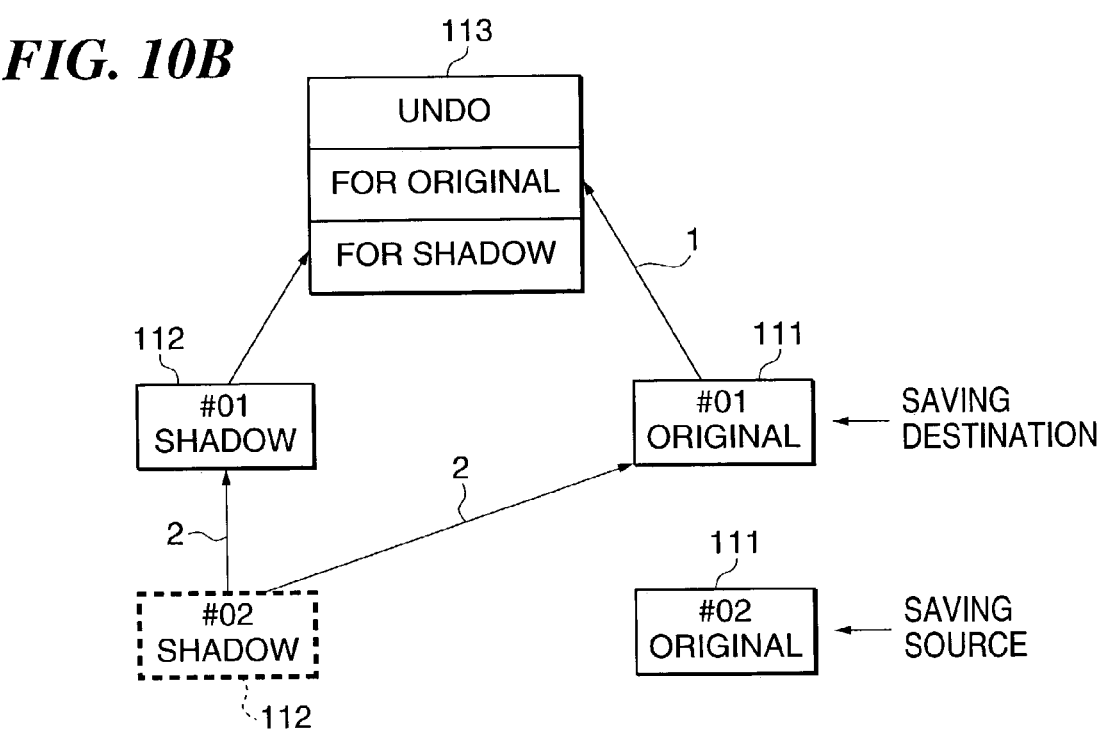
FIG. 10B is a diagram showing to which areas the scenes saved in respective areas are saved when the different number storing operation is performed according to the second embodiment of the present invention.

FIG. 10A is a diagram showing to which areas scenes saved in respective areas are saved when the same number storing operation is performed, and FIG. 10B is a diagram showing to which areas the scenes saved in respective areas are saved when the different number storing operation is performed are saved when the different number storing operation is performed.

In these figures, the bold solid lines indicate the current area after processing and the broken lines indicate the current area before processing.

As shown in FIG. 10A, when the same number storing operation is performed, a scene saved in a sub area of the original area 111 corresponding to the designated scene number (the same as the current number) is saved in the undo area 113, and subsequently a scene saved in a sub area of the shadow area 112 corresponding to the same scene number is saved in the same sub area of the original area 111. When the undo operation is performed, a scene stored in a sub area of the original area 111 corresponding to the current number indicated by the current pointer is saved in a sub area of the shadow area 112 corresponding to the current number, and a scene saved in the undo area 113 is saved in the original area 111. Since the scenes in the original area 111 and the shadow area 112 that correspond to the current number are the same as each other, the former processing (copying from the original area 111 to the shadow area 112) need not be performed. Before and after the same number storing operation, the position indicated by the current pointer and the value of the current number do not change.

As shown in FIG. 10B, when the different number storing operation is performed, scenes saved in sub areas of the original area 111 and in the shadow area 112 as the saving destinations indicated by the saving destination number are saved in the undo area 113, and then a scene saved in a sub area of the shadow area 112 as the saving source indicated by the current number is copied in the above sub area of the original area 111 as the saving destination and in the above sub area of the shadow area 112 as the saving destination.

Then, the current pointer is moved from the sub area of the shadow area 112 as the saving source to the sub area of the shadow area 112 as the saving destination, and the saving destination number is set as a new current number. When the undo operation is performed, the scene saved in the sub area of the original area 111 as the saving destination is copied to the sub area of the shadow area 112 as the saving source, and the scene saved in the undo area 113 is copied to the sub area of the original area 111 as the saving destination. Then, the current pointer is moved to a sub area of the shadow area 112 as the saving source for the different number storing operation, and the current number is changed to a scene number for the saving source.

Figure 11A:
FIG. 11A is a diagram showing that, when a sub area (#01) of a shadow area 112 is designated by a current pointer, a sub area (#01) of the original area 111 is designated by the current pointer after the execution of the same number recalling operation.

FIG. 11A shows that when a sub area (#01) of the shadow area 112 is designated by the current pointer, a sub area (#01) of the original area 111 is designated by the current pointer after the execution of the same number recalling operation.

Figure 11B:
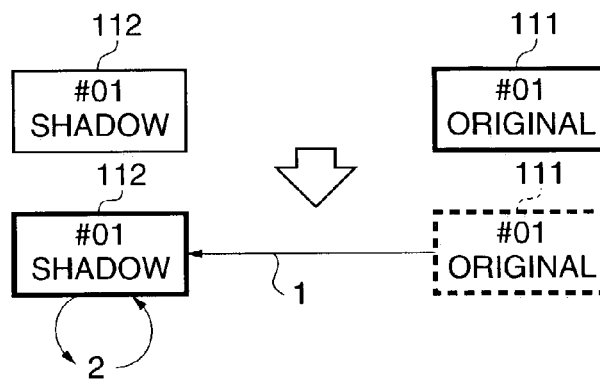
FIG. 11B is a diagram showing that, when the sub area of the original area 111 is designated by the current pointer and a scene saved in the sub area of the original area 111 is to be edited, the scene saved in the sub area of the original area 111 is copied to the sub area of the shadow area 112, this sub area of the shadow area 112 is designated by the current pointer, and the scene saved in the sub area of the shadow area 112 is edited.

FIG. 11B shows that when the sub area of the original area 111 is designated by the current pointer and a scene saved in the sub area of the original area 111 is to be edited, the scene saved in the sub area of the original area 111 is copied to the sub area of the shadow area 112, this sub area of the shadow area 112 is designated by the current pointer, and the scene saved in the sub area of the shadow area 112 is edited.

Figure 11C:
FIG. 11C is a diagram showing that, when the sub area of the original area 111 is designated by the current pointer, the sub area of the shadow area 112 is designated by the current pointer after execution of the same number recalling operation.

FIG. 11C shows that when the sub area of the original area 111 is designated by the current pointer, the sub area of the shadow area 112 is designated by the current pointer after execution of the same number recalling operation.

Figure 11D:
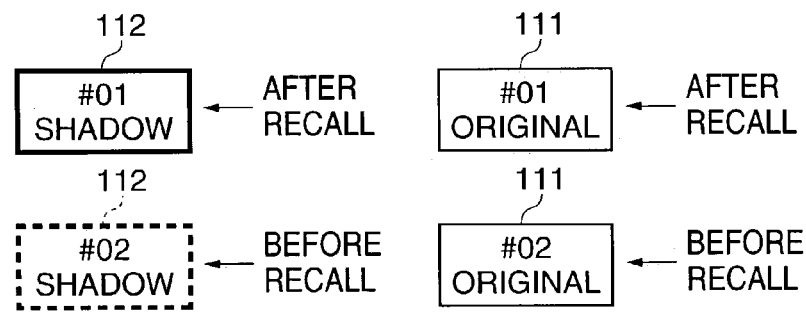
FIG. 11D is a diagram showing that, when a sub area (#02) of the shadow area 112 is designated by the current pointer, the sub area (#01) of the shadow area 112 corresponding to the recall number is designated by the current pointer after execution of the different number recalling operation.
Figure 11E:
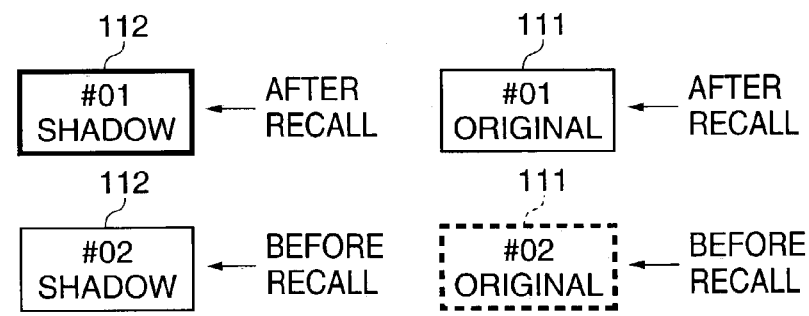
FIG. 11E is a diagram showing that, when a sub area (#02) of the original area 111 is designated by the current pointer, the sub area (#01) of the shadow area 112 corresponding to the recall number is designated by the current pointer after execution of the different number recalling operation.
Figure 12:
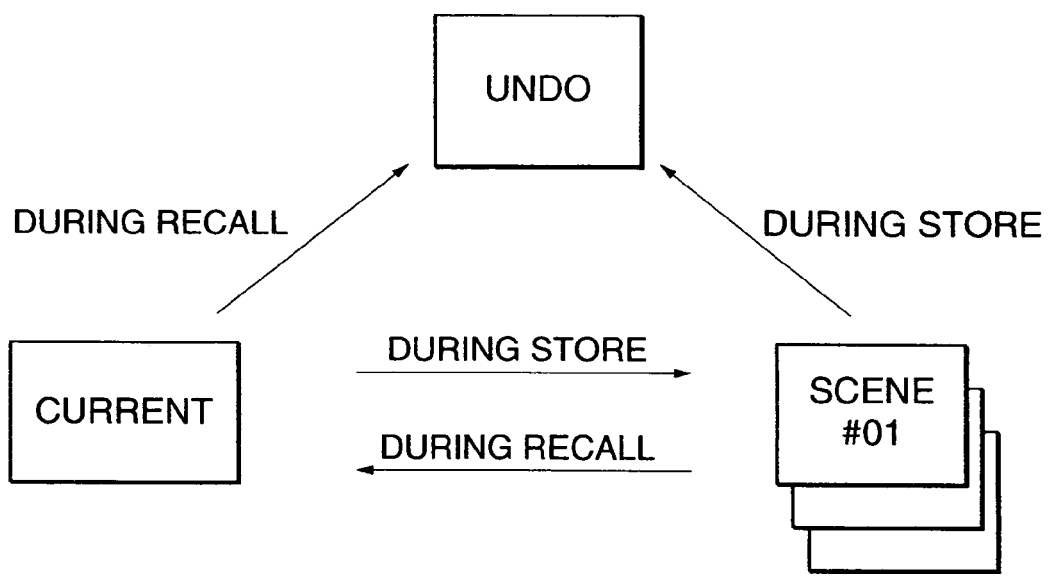
FIG. 12 is a diagram showing a scene saving process and a recalling process performed by a conventional digital mixer.

FIG. 11D shows that when a sub area (#02) of the shadow area 112 is designated by the current pointer, the sub area (#01) of the shadow area 112 corresponding to the recall number is designated by the current pointer after execution of the different number recalling operation;

FIG. 11E is a diagram showing that, when a sub area (#02) of the original area 111 is designated by the current pointer, the sub area (#01) of the shadow area 112 corresponding to the recall number is designated by the current pointer after execution of the different number recalling operation.

As shown in FIGS. 11A~11E, when recall processing is performed, it suffices to move only the current pointer and hence the amount of copying operation for copying scenes as data is decreased, so that the processing can be performed at higher speed.

As described above, according to the present embodiment, when the same number recalling operation or the different number recalling operation is performed, it suffices to move only the current pointer, and hence the amount of copying of scenes as data is decreased compared to the first embodiment as described before. As a result, the processing can be performed at higher speed. The use of the current pointer makes it also possible to allot the current area 114 of the SRAM 11 to another area.

Although in the present embodiment, the current pointer is used to designate a sub area of the original area 111 or the shadow area 112, the current pointer may be fixed so as to designate only a sub area of the shadow area 112, and to recall a scene saved in a sub area of the original area 111, special instruction can be issued from the panel operator 9 to the CPU 1 such that a scene saved in the sub area of the shadow area 112 may be copied to the undo area 113 and the scene saved in the sub area of the original area 111 may be copied to the sub area of the shadow area 112.

A collective saving switch may be provided in the panel operator 9 for collectively saving all scenes saved in the shadow area 112 to sub areas of the original area 111 corresponding to the respective scenes. By providing this switch, for example, a plurality of new scenes may be created in the shadow area 112 without performing any storing operation, and by finally depressing the switch, the plurality of scenes can be collectively copied to the original area 111.

Although in the first and second embodiments, only one undo area 113 having a sub area for the shadow area and a sub area for the original area is provided, a plurality of undo areas 113 may be provided in the SRAM 11 so that the undo operation can be performed a plurality of times.

Although in the first and the second embodiments, by repeating the same number recalling operation, a sub area of the shadow area and a sub area of the original area that correspond to the scene number related to the same number recalling operation can be alternately recalled and this is used as means for recalling a scene in a sub area of the original area. In addition to or in place of this method, a switch may be provided in the panel operator 9 for directly recalling a scene saved in the original area 111. In an arrangement that the original area 111 is not recalled by the same number recalling operation, no change occurs in the scene in the current area 114 by the same number recalling operation so that saving of a scene in the current area to the shadow area 112 is not required.

Although in the first embodiment, a scene in the current area 114 is saved in the shadow area 112 when the scene recalling operation is performed, alternatively a scene in the current area 114 as well as a scene in the shadow area 112 may be changed during operation of the fader 8 or the panel operator 9. In this case, the scene in the current area 114 needs to be changed immediately though there is no problem even if the change of the scene in the shadow area is somewhat delayed.

Although in the first and second embodiments, when the same number recalling operation is performed, a scene in the original area 111 and a scene in the shadow area 112 are alternately recalled, this alternate recalling need not be performed during the same number recalling operation, and such alternate recalling itself may not be required.

The present invention may be applied not only to scenes in a digital mixer, but also to a wide variety of data used by various electronic apparatuses, such as tone color data and waveform data used by a musical tone generating apparatus, automatic performance data and automatic accompanying data, and registration data used by an automatic musical performance apparatus, effect control data used by an effector, picture color data used by a video apparatus. The operation data used in the present invention covers even such data.

It is to be understood that the object of the present invention may also be accomplished by supplying a system or an apparatus with a program code of software realizes the functions of any of the above described embodiments, and causing a computer (or CPU or MPU) of the system or apparatus to read out and execute the program code.

In this case, the program code itself realizes the functions of any of the embodiments described above, and the program code constitutes the present invention.

What is claimed is:

1. An electronic apparatus comprising:
   a panel operator;
   a shadow storage that stores n sets of operation data for controlling operation of the electronic apparatus;
   an original storage that stores n sets of original operation data corresponding respectively to the n sets of operation data stored in said shadow storage;
   a current storage that stores operation data being currently used to control operation of the electronic apparatus and including a set of operation data as initial data selected from the n sets of operation data stored in one of said shadow storage and set current storage;
   a changing section responsive to operation of said panel operator, for changing contents of the operation data stored in said current storage and changing contents of a set of operation data of the n sets of operation data stored in said shadow storage that corresponds to the operation data stored in said current storage;
   a shadow recalling section responsive to operation of said panel operator, for selecting a set of operation data from said shadow storage, and writing the selected set of operation data into said current storage;
   an original recalling section responsive to operation of said panel operator, for selecting a set of original operation data from said original storage, and writing the selected set of original operation data into said current storage; and
   a saving section responsive to operation of said panel operator, for selecting a storage area in said original storage and a corresponding storage area in said shadow storage where a set of operation data and a corresponding set of operation data are stored, respectively, and saving the set of the operation data stored in said current storage to the selected storage areas in said shadow storage and said original storage.

2. An electronic apparatus according to claim 1, further comprising an undo storage that stores operation data immediately before being changed in contents, the undo storage having an area for storing a set of original operation data of the n sets of the original operation data stored in said original storage, and an area for storing a set of operation data of the n sets of the operation data stored in said shadow storage.

3. An electronic apparatus according to claim 1, wherein said current storage and said shadow storage are formed in separate bodies from each other.

4. An electronic apparatus according to claim 1, further comprising a switch section that selectively switches between a state of said shadow storage in which it is in use and a state of said shadow storage in which it is out of use, and wherein when the state of said shadow storage in which it is out of use is selected, the electronic apparatus operates as an ordinary apparatus without said shadow storage.

5. An electronic apparatus according to claim 1, wherein said original recalling section selects a set of original operation data from said original storage corresponding to an immediately preceding set of operation data selected by said shadow recalling section, and writes the selected set of original operation data in into said current storage.

6. An electronic apparatus according to claim 5, wherein said panel operator comprises a plurality of operating elements, and said shadow recalling section and said original recalling section operate in response to operation of a same operating element of said operating elements such that said shadow recalling section and said original recalling section alternately operate in response to operation for consecutively selecting a same set of operation data from the n sets of operation data.

7. An electronic apparatus according to claim 1, further comprising:
   an undo storage that stores temporarily a set of operation data stored in said shadow storage and a set of original operation data stored in said original storage;
   a destination number input section responsive to operation of said panel operator, for inputting a saving destination number indicating a saving destination of the operation data stored in said current storage; and a same number storing section that stores in said undo storage, a set of operation data corresponding to the saving destination number, of the n sets of operation data stored in said shadow storage and a set of operation data corresponding to the saving destination number, of the n sets of original operation data stored in said original storage, and then stores a set of operation data stored in said current storage in said shadow storage at a storage location corresponding to the saving destination number and in said original storage at a storage location corresponding to the saving destination number.

8. An electronic apparatus according to claim 7, further comprising a different number storing section that stores in said undo storage a set of operation data corresponding to the saving destination number, of the n sets of operation data stored in said shadow storage and a set of operation data corresponding to the saving destination number, of the n sets of original operation data stored in said original storage, and then stores a set of operation data stored in said current storage in said shadow storage at a storage location corresponding to said current storage, and in each of said shadow storage and said original storage at a storage location corresponding to the saving destination number.

9. An electronic apparatus according to claim 7, further comprising an undo operating section responsive to operation of said panel operator, for storing a set of operation data stored in said shadow storage at the storage location corresponding to the saving destination number in said current storage, and then returning the set of operation data stored in said shadow storage and the set of original operation data stored in said original storage, which were temporarily stored in said undo storage, to said shadow storage and said original storage at respective original storage locations.

10. An electronic apparatus according to claim 1, further comprising an input section responsive to operation of said panel operator by the user, for inputting selection data for designating one of the n sets of operation data stored in said shadow storage or the n sets of original operation data stored in said original storage as current operation data, wherein when said input section inputs selection data which is different from immediately preceding selection data inputted by said input section, said shadow recalling section selects a set of operation data from said shadow storage, which is designated by the input selection data and writes the selected set of operation data into said current storage in response to the input of the selection data, and when said input selection inputs same selection data consecutively two times, said original recalling section selects a set of original operation data from said original storage which is designated by the same selection data and writes the selected set of original operation data into said current storage in response to the input of the selection data.

11. An electronic apparatus comprising:
panel operator;
a storage that stores n sets of operation data and n sets of original operation data corresponding to the n sets of operation data;
a first selector responsive to operation of said panel operator, for selecting one of the n sets of operation data stored in said storage as current operation data;

a controller that controls the electronic apparatus based on the selected current operation data;

a changing section responsive to operation of said panel operator, for copying the set of operation data selected as current operation data to a storage area of a corresponding set of the original operation data in said storage; and a second selector responsive to operation of said panel operator, for selecting, as the current operation data, one of the n sets of original operation data stored in said storage.

12. An electronic apparatus according to claim 11, wherein said second selector selects a set of original operation data corresponding to the set of operation data selected by said first selector.

13. An electronic apparatus according to claim 11, wherein said panel operator comprises a plurality of operating elements, and said first selector and said second selector operate in response to operation of a same operating element of said operating elements such that said first selector operates when the operation for selecting a set of operation data from the n sets of operation data is first performed, and said second selector operates when the operation for selecting the same set of operation data of the n sets of operation data is consecutively performed two times.

14. An electronic apparatus according to claim 11, wherein said panel operator comprises a plurality of operating elements, and said first selector and said second selector operate in response to operation of a same operating element of said operating elements such that said first selector and said second selector alternately operate in response to operation for consecutively selecting a same set of operation data from the n sets of operation data.

15. An electronic apparatus according to claim 11, further comprising an input section responsive to operation of the panel operator by the user, for inputting selection data for designating one of the n sets of operation data stored in said storage or one of the n sets of original operation data stored in said storage, and wherein when said input section inputs selection data which is different from immediately preceding selection data inputted by said input section, said first selector selects a set of operation data from said storage, which is designated by the input selection data, as the current operation data, and when said input section inputs same selection data consecutively two times, said second selector selects a set of original operation data from said storage, which is designated by the input same selection data, as the current operation data.

16. An electronic apparatus according to claim 15, wherein if said second selector selects one of the n sets of original operation data stored in said storage as the current operation data, and selection data that is same as selection data, by which the selected set of original operation data is designated, is inputted by said input section, said first selector selects a corresponding set of operation data designated by the same selection data as the current operation data.

17. An electronic apparatus according to claim 15, wherein if said first selector selects one of the n sets of operation data stored in said storage as the current operation data, and selection data that is different from selection data, by which the selected set of operation data is designated, is inputted by said input section, said first selector selects a set of operation data designated by the different selection data as the current operation data.

18. An electronic apparatus according to claim 15, wherein if said second selector selects one of the n sets of original operation data stored in said storage as the current operation data, and selection data that is different from selection data, by which the selected set of original operation data is designated, is inputted by said input section, said first selector selects a set of operation data designated by the different selection data as the current operation data.

19. An electronic apparatus according to claim 11, further comprising a copying section for copying a set of original operation data to a storage area of a corresponding set of the operation data stored in said storage, and wherein when the set of original operation data is selected as the current operation data by said second selector and an operation of said panel operator for changing the current operation data is carried out by the user, said changing section changes the current operation data after said copying section copies the set of original operation data to the storage area of the corresponding set of operation data and said first selector selects the corresponding set of operation data as the current operation data.

20. An electronic apparatus comprising:

a shadow storage that stores n sets of operation data;

an original storage that stores n sets of operation data corresponding respectively to the n sets of operation data stored in said shadow storage;

a current storage that stores a set of operation data;

a selector that selects a set of operation data from the n sets of operation data stored in said shadow storage or a set of original operation data from the n sets of original operation data stored in said original storage as the set of operation data to be stored in the current storage;

a controller that controls the electronic apparatus according to the set of operation data stored in said current storage;

a changing section that changes contents of the set of operation data stored in said current storage, and changes contents of a set of operation data of the n sets of operation data stored in said shadow storage that corresponds to the set of operation data selected by said selector, in synchronism with the changing of the contents of the set of operation data stored in said current storage; and a saving section that selects a storage area in said original storage and a corresponding storage area in said shadow storage where a set of original operation data and a corresponding set of operation data are stored, respectively, and saves the set of operation data stored in said current storage to the selected storage areas in said shadow storage and said original storage.

21. An electronic apparatus according to claim 20, further comprising:

an undo storage that stores a set of operation data stored in said shadow storage and a set of original operation data stored in said original storage immediately before being changed in contents by said changing section or selected by said saving section, the undo storage having an area for storing a set of original operation data stored in said original storage, and an area for storing a set of operation data stored in said shadow storage; and an undo section that returns the set of original operation data stored in the area of said undo storage and the set of operation data stored in the area of said undo storage to said shadow storage and said original storage at respective original storage locations thereof, immediately before being changed by said changing section or selected by said saving section.

* * * * *